W. V. TURNER.
BRAKE VALVE DEVICE.
APPLICATION FILED DEC. 6, 1916.
1,294,977. Patented Feb. 18, 1919.
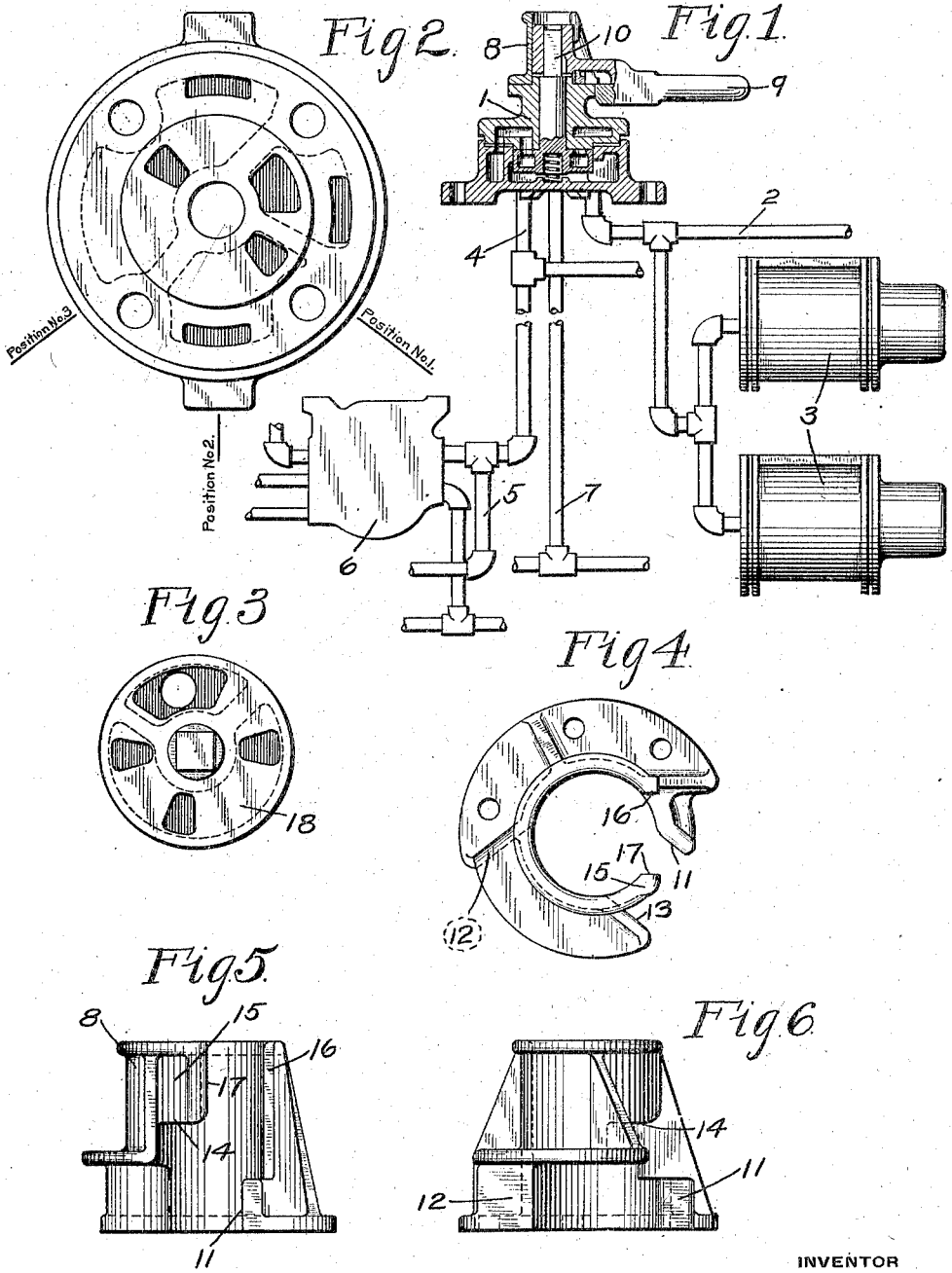
INVENTOR
Walter V. Turner
by Wm. M. Cady
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE-VALVE DEVICE.

1,294,977.

Specification of Letters Patent. Patented Feb. 18, 1919.

Application filed December 6, 1916. Serial No. 135,366.

*To all whom it may concern:*

Be it known that I, WALTER V. TURNER, a citizen of the United States, residing at Wilkinsburg, in the county of Allegheny and State of Pennsylvania, have invented new and useful Improvements in Brake-Valve Devices, of which the following is a specification.

This invention relates to manually controlled valves having removable handles, and more particularly to a brake valve device of this character.

In a double end equipment employing manually operated valves and a removable handle, it is usually desirable to leave the valve in lap position when the handle is removed, but in some cases, there is a disadvantage in having a lap position when operating because the handle might accidentally be left in this position and thus interfere with the desired operation of the apparatus.

For example, according to the construction shown in my prior Patent No. 1,183,911 dated May 23, 1916, there is provided a combined automatic and straight air locomotive brake equipment having an automatic brake valve, an independent brake valve and an additional brake valve device having one position for permitting the straight air application and release of the brakes on the train while the locomotive brakes remain released, a second position, in which the brakes can be applied and released by straight air on both the locomotive and train, and a third position in which the brakes can be applied or released on the locomotive by straight air while the train brakes remain released, or in which the brakes may be controlled automatically by manipulation of the automatic brake valve.

If the additional brake valve device could be turned to a lap position, then there is danger that the valve may be accidentally left in this position, so that the usual control of the brakes might be interfered with.

The principal object of my invention is to provide a manually controlled valve device having a removable handle which cannot turn the valve to lap position unless the handle is removed from the brake valve.

In the accompanying drawing; Figure 1 is a diagrammatic view, with the brake valve device in section, of a portion of a locomotive brake equipment, showing my invention applied; Fig. 2 a plan view of the rotary valve seat of the brake valve device; Fig. 3 a face view of the rotary valve; Fig. 4 a plan view of the handle guard for the handle of the brake valve device; Fig. 5 a front elevation of the handle guard; and Fig. 6 a side elevation thereof.

My invention is shown applied in Fig. 1 of the drawings, to the additional brake valve device of an engine brake equipment similar to that disclosed in the hereinbefore mentioned Patent No. 1,183,911 except that in the present case, brake valves are provided at each end of the car and the piping is correspondingly changed.

The additional brake valve 1 is connected by pipe 2 to the brake cylinder 3, the pipe 2 leading to the additional brake valve at the opposite end of the car or locomotive.

A pipe 4 connects with the brake cylinder pipe 5 of the distributing valve device 6, through which fluid is supplied to and released from the brake cylinders by operation of the distributing valve device.

To the brake valve 1 there is also connected a straight air pipe 7 for controlling the straight air application and release of the brakes on the train.

The additional brake valve device has three operating positions; in position No. 1, the locomotive brake cylinders 3 are connected to the exhaust and the distributing valve pipe 4 is connected to the straight air pipe 7, so that the brakes in the train can be controlled by straight air upon manipulation of the usual independent brake valve (not shown). In position No. 2, the distributing valve pipe 4 is connected to the brake cylinder pipe 2 and also to the straight air pipe 7, so that the brakes can be controlled by straight air on both the locomotive and train. In position No. 3, the distributing valve pipe 4 is connected to the locomotive brake cylinders 3, while the straight air pipe 7 is connected to the atmosphere, so that when the independent brake valve is operated, the brakes can be applied or released on the locomotive, while the train brakes remain released.

According to my invention, a handle guard 8 is provided for the handle 9 of the additional brake valve 1 and when the guard is in position and the handle is fully applied to the valve stem 10, the rotary movement of the handle to the right is limited by engagement with the face 11 of the handle guard, when the handle is in position No. 1. Upon movement of the handle to the left, the movement is limited by engagement with the face 12 of the guard, when the handle is in position No. 3, so that the handle, when fully applied, cannot be moved in either direction beyond the extreme operating positions 1 and 3.

If it is desired to remove the handle 9 from the brake valve, the same is shifted to the opening in the guard formed by the adjacent faces 11 and 13 and the handle is then raised until it vertically engages a face 14 of a projecting lug 15 of the guard. The handle must now be turned to the right until the same is in proper alinement so as to pass through the vertical opening formed by the faces 16 and 17, in which the handle may be removed.

By this movement, the rotary valve 18 of the brake valve is turned to a lap position, and consequently, the handle cannot be removed without moving the rotary valve to lap position, while on the other hand, the rotary valve cannot be turned to a lap position, so long as the handle is in its normal operating position, on the stem 10 of the rotary valve.

After the handle has been raised and shifted to move the valve to lap position, the same need not be entirely removed; for instance, where two locomotives are connected in the train, it may be desirable to leave the handle on the brake valve on the second locomotive, although the brake valve should, of course, be left in lap position.

Having now described my invention, what I claim as new and desire to secure by Letters Patent is:—

1. The combination with a valve having operating positions and a removable handle for operating said valve, of a guard member for preventing the removal of the handle in said positions, and having an opening for permitting the removal of the handle in another position.

2. The combination with a valve having a range of operating positions and a removable handle for operating said valve, of a guard member having means for normally limiting the movement of the valve to its operating range and for preventing removal of the handle, and provided with an opening for permitting the removal of the handle in another position.

3. A guard for a removable handle having stops for limiting the lateral movement of the handle and means for preventing vertical movement, and having a tortuous passageway for permitting a partial vertical movement of the handle and then removal of the handle upon a lateral movement thereof.

4. In a brake valve device, the combination with a valve having a plurality of operating positions and a removable handle for actuating said valve, of a guard for the handle having stops for limiting the operating range of movement of the handle to the extreme operating positions of the valve and provided with means for preventing removal of the handle within the operating range and having a passage-way at one of the limiting positions for permitting removal of the handle upon movement thereof vertically and then laterally.

In testimony whereof I hereunto set my hand.

WALTER V. TURNER.